US007933691B2

(12) United States Patent
Pitt et al.

(10) Patent No.: US 7,933,691 B2
(45) Date of Patent: Apr. 26, 2011

(54) SYSTEM FOR AND METHOD OF MONITORING FREE PLAY OF AIRCRAFT CONTROL SURFACES

(75) Inventors: Dale M. Pitt, St. Louis, MO (US); Jason C. Kiiskila, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1268 days.

(21) Appl. No.: 11/338,575

(22) Filed: Jan. 24, 2006

(65) Prior Publication Data

US 2007/0173988 A1 Jul. 26, 2007

(51) Int. Cl.
*G01H 1/00* (2006.01)
(52) U.S. Cl. .................................. 701/3; 73/583; 73/659
(58) Field of Classification Search .................. 73/570, 73/583, 649, 658, 659; 701/3
See application file for complete search history.

(56) References Cited

U.S. PATENT DOCUMENTS

| 5,327,358 A | | 7/1994 | Stubbs | |
| 5,804,697 A | * | 9/1998 | Banaszak | 73/1.82 |

FOREIGN PATENT DOCUMENTS

| DE | 4240600 | | 6/1994 |
| DE | 4240600 C1 | * | 6/1994 |

OTHER PUBLICATIONS

Sensburg et al, Translation of DE 42 40 600, Jun. 9, 1994, EPO.*
Kehoe, Michael W, Aircraft Ground Vibration Testing at NASA Ames-Dryden Flight Research Facility, Jul. 1987, NASA.*
Smyslov et al, The Experience in Ground Vibration Tests of Flexible Flying Vehicles Using PRODERA Equipment and Some Additional Tasks, Jul. 4, 2005, European Conference for Aerospace Sciences.*
Kehoe et al, Aircraft Ground Vibration Testing at the NASA Dryden Flight Research Facility-Jun. 1993-1994, NASA.*
Baek et al.; "Backlash Estimation of a Seeker Gimbal with Two-Stage Gear Reducers"; The International Journal of Advance Manufacturing Technology; 2003; pp. 604-611; XP002437043; Springer-Verlag London Limited; London.
International Search Report and the Written Opinion of the International searching Authority (EPO) dated Jun. 20, 2007 on the corresponding PCT application (PCT/US2006/046710).

* cited by examiner

*Primary Examiner* — Khoi Tran
*Assistant Examiner* — Spencer Patton
(74) *Attorney, Agent, or Firm* — Yee & Associates, P.C.; Euclid Woo

(57) ABSTRACT

A system for monitoring the free play in aircraft control surfaces includes one or more accelerometers secured in or on the aircraft control surfaces and a computer system connected to the one or more accelerometers and to one or more control surface actuators to selectively activated to selectively activate a control surface and send a reading from the control surface to the computer system. The computer system includes means to plot the readings from the one or more accelerometers on the control surfaces to plot a curve of the free play in the selected control surface. The method of the invention utilizes the one or more accelerometers placed in or on the aircraft control surfaces and connects them to the aircraft's flight control computer or a similar computer to receive signals originated by vibrating the control surfaces and plotting curves of the free play measured in the control surfaces.

17 Claims, 7 Drawing Sheets

SYSTEM FOR AND METHOD OF MONITORING FREE PLAY OF AIRCRAFT CONTROL SURFACES

BACKGROUND OF THE INVENTION

1. Field of the Invention

This invention generally relates to aircraft surface measurements, and more particularly, to a system for and a method of monitoring the free play of aircraft control surfaces.

2. Description of the Prior Art

All aircraft include movable control surfaces for directional control during flight. Such control surfaces, particularly those in military and commercial aircraft, must be monitored throughout their life, for, amongst other things, the free play of the control surfaces. Free play in control surfaces is an important consideration in maintaining control of the aircraft. Excessive control surface free play can result in flutter, divergence, and other dynamic and aeroelastic instabilities. Free play can also effect control surface vibrations and natural frequencies of structures. Since increasing levels of free play can result in increased fatigue failure of control surfaces, both the military and the FAA have issued standards that outline the amount of free play that is allowed on different aircraft control surfaces for the service life of such aircraft. Additionally, the standards set predetermined points throughout the service life of an aircraft when free play must be tested and monitored to document wear and assure that predetermined specifications can be met.

The current industry standard for measuring aircraft control surface free play requires a static free play test. This is typically done by applying a known load to the control surface and measuring the corresponding deflection, either a linear measurement or angular displacement. For example, a Rotation Variable Differential Transformer (RVDT) is used to measure the rotation between a rudder and a tail of an aircraft, while a test hydraulic actuator and a load cell are used to record the load. Such setups are very labor intensive and can take a considerable amount of time. Furthermore, larger aircraft, such as the Boeing™ C-17™ and Boeing™ 747™ require a tester to maneuver heavy test equipment (load cells, RVDT, hydraulic actuators and their plumbing) up to and down from great heights to measure rudder and stabilator free play. This can sometimes cause delays, damage to the aircraft or other problems. As used herein, all occurrences of BOEING, 747, and C-17 are trademarks or registered trademarks of Boeing Management Company.

Normally, the static free play test is started at zero load and increased to some percentage of ultimate load. Large hydraulic cylinders are required to apply such loads and place the aircraft being tested at risk of being damaged. During testing, the moment or applied load is plotted versus displacement. For a surface with no free play and a linear spring stiffness, this plot is a straight line, with the slope of this measured line being the effective spring stiffness. As free play is introduced into the system, a discontinuity in the curve occurs near the zero load range. For larger displacement values the slope increases, and is more representative of the effective stiffness without the free play. As hysteresis is introduced into the system, the load versus displacement forms a known type curve.

No current system or method is known for dynamically measuring the free play of aircraft control surfaces. Therefore, there is a long felt need in the art for a system and/or a method for dynamically measuring and monitoring the free play of aircraft control surfaces, without incurring the risk of damaging the tested aircraft, and which overcomes other known problems, while allowing easier and less time-consuming monitoring of aircraft control surface free play.

SUMMARY OF THE INVENTION

Accordingly, it is a general object of the present invention to provide an improved aircraft control surface free play monitoring system. It is a particular object of the present invention to provide an improved method for monitoring free play of aircraft control surfaces. It is a further particular object of the present invention to provide an improved aircraft control surface free play monitoring system utilizing one or more accelerometers secured in or on control surfaces. It is yet another particular object of the present invention to provide an improved method for monitoring free play of aircraft control surfaces by the use of accelerometers placed in or on the aircraft control surfaces and connected to an operating system, such as the aircraft's flight control computer. It is a still further particular object of the present invention to provide an improved system for monitoring free play in control surfaces of aircraft, comprising at least one accelerometer placed in or on at least one control surface; a computer system connected to the at least one accelerometer; the computer system including a connection to the at least one control surface to vibrate the at least one control surface; and the computer system receiving a signal from the least one accelerometer when the at least one control surface is vibrated and plotting a curve of the readings from the least one accelerometer indicating the free play in the at least one control surface. And, it is yet still another particular object of the present invention to provide a method of monitoring free play in control surfaces of aircraft, comprising: providing at least one accelerometer in or on at least one control surface; providing a computer system and connecting it to the at least one accelerometer; providing a connection between the computer system and an operator of the at least one control surface to vibrate the at least one control surface; and providing the computer system with means to receive a signal from the least one accelerometer when the at least one control surface is vibrated and to plot a curve of the computer processed frequency readings from the least one accelerometer to indicate the free play in the at least one control surface.

In accordance with one aspect of the present invention, there is provided a system for monitoring free play in control surfaces of aircraft having at least one accelerometer placed in or on at least one control surface with a computer system connected to the at least one accelerometer and connected to the at least one control surface to vibrate the at least one control surface so as to receive a signal from the least one accelerometer when the at least one control surface is vibrated, whereby a curve of the readings from the least one accelerometer indicating the free play in the at least one control surface may be plotted. The present invention also provides a method of monitoring free play in control surfaces of aircraft by providing at least one accelerometer in or on at least one control surface and connecting the accelerometer to a computer system and the computer system to an operator of the at least one control surface to vibrate the at least one control surface whereby the computer system will receive a signal from the least one accelerometer and plot a curve of the computer processed frequency readings from the least one accelerometer to indicate the free play in the at least one control surface.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved method of and system for monitoring free play in aircraft control surfaces.

The present invention provides a new technique for dynamically measuring the free play of aircraft control surfaces. The technique is based on the discovery that the control surfaces on an aircraft act as a pendulum in the free play zone and possess a low frequency pendulum mode that can be distinguished from a higher frequency control surface rotation mode. Therefore, when a control surface is driven or shaken enough it will vibrate both inside and outside the free play zone. Time history responses of such driven or shaken control surfaces will contain two distinct frequencies. The lowest frequency amplitude is a measure of the time spent within the free play range and the higher frequency is a measure of the time spent outside of the free play range. A numerical simulation was developed and an experiment with a pendulum representing an aircraft control surface was conducted to validate and verify the ability to both qualitatively and quantitatively dynamically measure free play of aircraft control surfaces. Time history simulation responses of the simulation allowed the spring stiffness to be varied as a function of pendulum position. The spring stiffness was reduced when the pendulum was in free play. The nonlinear time history responses were processed in the frequency domain using a linear FFT to obtain a PSD of the response. The peaks of these responses were shown to directly relate/correlate with free play values.

The experimental set-up of the simple pendulum simulation was fabricated with a simple pendulum having an accelerometer mounted thereon to measure the response. The apparatus had adjustable free play values. The experimental results reinforced the simulation results and showed that a new method and system had been developed that was both faster and simpler than known devices and methods, such as the standard force application method for measuring free play.

Figure 7:
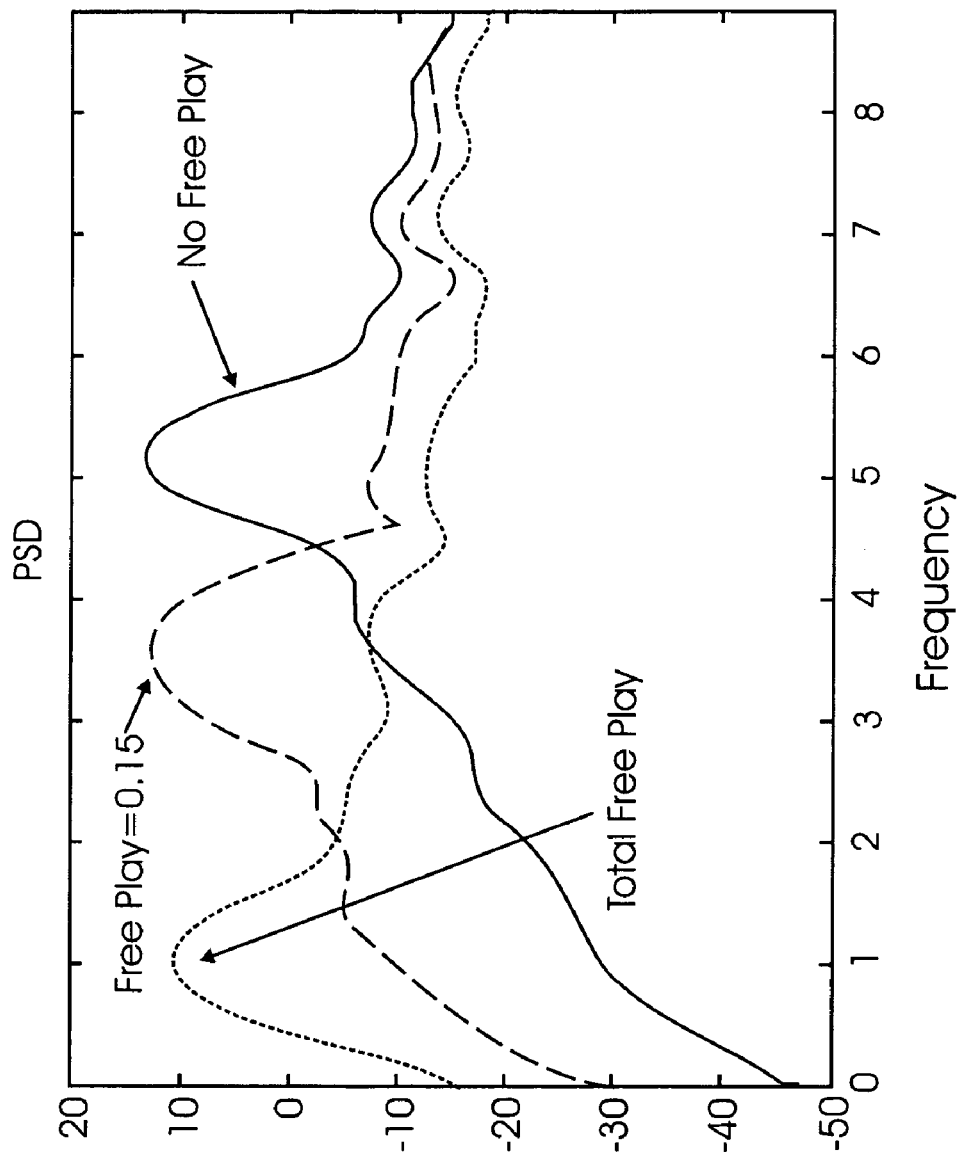
FIG. 7 shows plots of the results of multiple simulations conducted with varying values of free play showing that the peak frequency amplitude and frequency value are directly related to the amount of control surface free play.

The new method and system can use the aircraft flight control computer or may be connected and operated by a separate, stand-alone computer system, of a known type, to generate a random or sinusoidal signal to the control surface actuator. The signal will cause the control surface to shake or vibrate, in a manner similar to that which occurs during operation of the aircraft. A small accelerometer placed on or in the control surface will record the vibrations. Linear frequency processing techniques or non-linear Higher Order Spectra Signal processing, as explained more fully below, are used to determine the amount of control surface free play. Plots of the results of the numerical simulations, such as shown in FIG. 7, verify that the peak frequency value is directly related to the amount of control surface free play.

As is known to those skilled in the art, every joint has certain levels of free play caused by slop in bolts, hinges, actuators and other parts. These free play effects are inherently nonlinear and notoriously difficult to analyze and measure. Control surfaces on high speed fighter aircraft and commercial aircraft typically exhibit free play and often display a unique challenge for determining the mode shapes and resonant frequencies.

Figure 1:
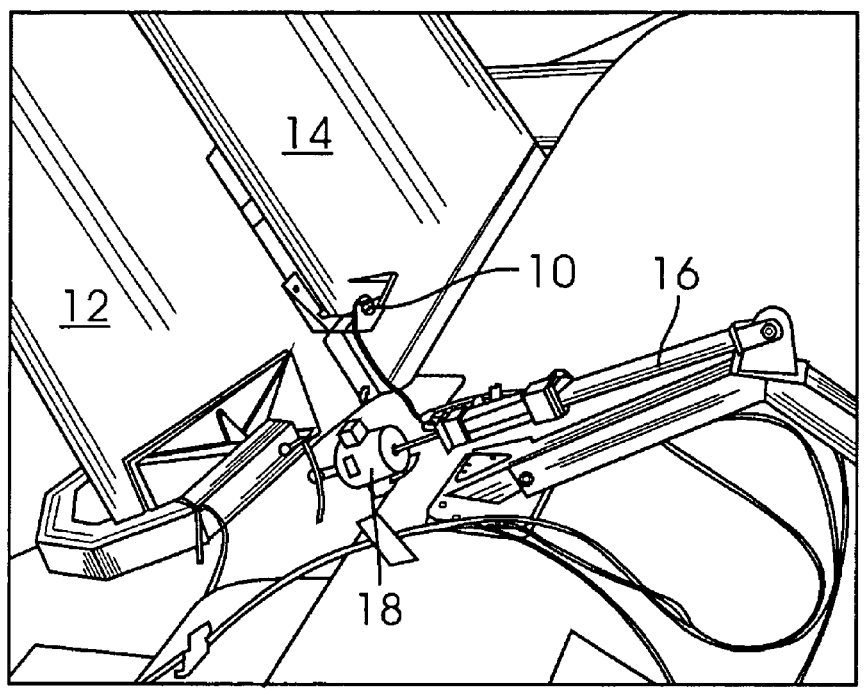
FIG. 1 is a view of a prior art static system used to test the free play in a control surface of an aircraft.

As shown in FIG. 1, the current industry standard for measuring aircraft control surface free play is a static test. This test is performed by applying a known load to the control surface and measuring the corresponding deflection, either a linear measurement or angular displacement. A Rotation Variable Differential Transformer (RVDT) as shown at 10 in FIG. 1 measures the rotation between a rudder 12 and a tail 14 of an aircraft, while a hydraulic actuator 16 and a load cell 18 are used to record the load. To perform such a static test takes a considerable amount of time to setup, and is very labor intensive. Furthermore, larger aircraft, such as the Boeing™ C-17™ and Boeing™ 747™ requires heavy test equipment (load cells, RTDV, hydraulic actuators and their plumbing) to be moved to great heights and then set up in such positions to measure rudder and stabilator free play.

Figure 2:
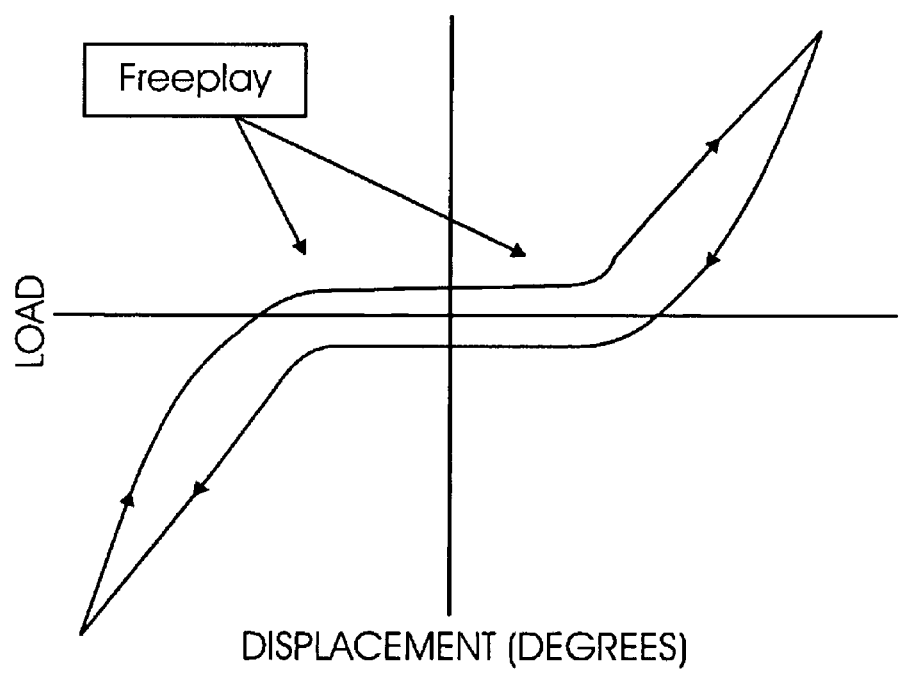
FIG. 2 is a typical plot of load versus displacement for free play obtained with the static system of FIG. 1.

As is shown in FIG. 2, after the equipment for the static free play test of FIG. 1 is set up, a test is performed starting at zero load and increasing to a selected percentage of a predetermined ultimate load for the control surface being tested. FIG. 2 shows the moment or applied load plotted versus displacement. For a surface with no free play and a linear spring stiffness, this plot is a straight line, with the slope of this measured line being the effective spring stiffness. As free play is introduced into the system, a discontinuity in the curve occurs near the zero load range. For larger displacement values the slope increases and is more representative of the effective stiffness without the free play. As hysteresis is introduced into the system, the load versus displacement forms known curves, of the type illustrated in FIG. 2.

Figure 3:
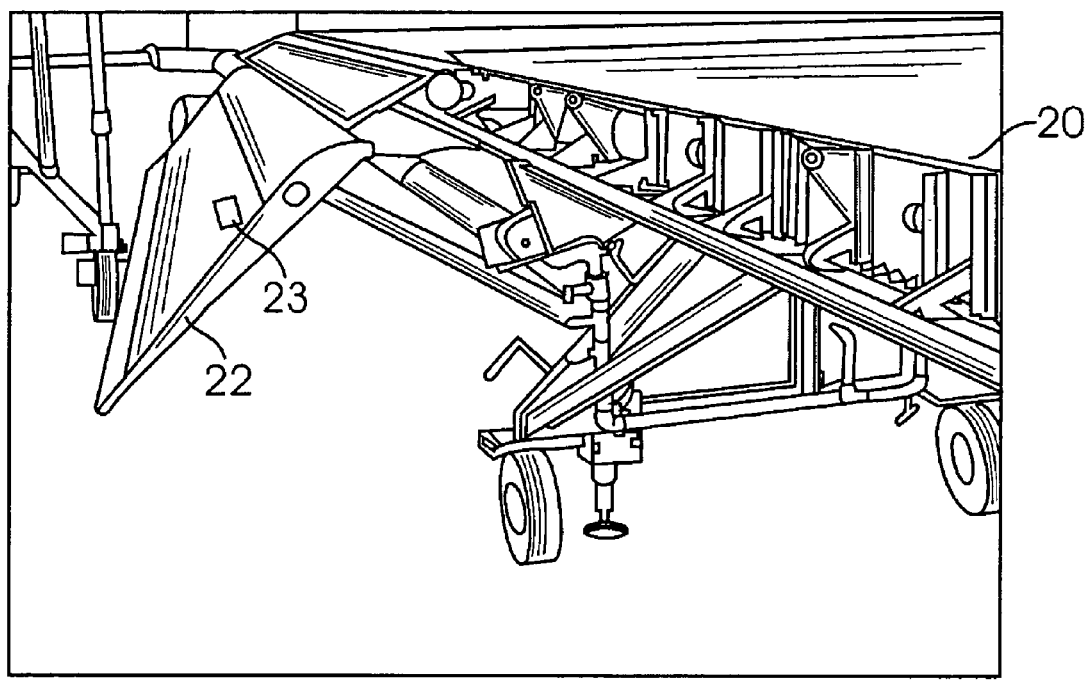
FIG. 3 is a perspective view of a partial cross section of the trailing edge flap of an aircraft illustrating the dynamic system and method of the present invention.

FIG. 3 shows a wing 20 of an aircraft with an aileron 22 in a lowered position attached to the wing and the hydraulic aileron actuator removed. The trailing edge of the aileron or flap 22 resembles a physical pendulum. It is known that control surface rotational inertia can be measured by allowing the control surface to rotate about its hinge line and measuring the frequency or period of oscillation and calculate inertia from its known weight and center of gravity (c.g.). The present invention utilizes the principles of a pendulum and numerical simulations to show that the amount of free play that the control surface has can be measured in a dynamic fashion. A dynamic test excites (shakes or vibrates) the control surface, as by means of the sending of a random or sinusoidal signal to the control surface actuator. At least one accelerometer, such as 23, placed in, as by embedding, or on the aileron 22, measures the response of the control surface to this shaking or vibration. Other accelerometers may be secured in or to other control surfaces on the aircraft, or a portable accelerometer could be fastened on each control surface to be monitored, as needed. The response measured by the accelerometer(s) will have two distinct frequencies, one of which will be the control surface rotation frequency that is a function of the control surface hydraulic actuator and rotation inertia. The second frequency is that associated with the control surface in the free play range (where the actuator stiffness is assumed to be zero) and the frequency is that of the pendulum mode. The accelerometer 23, or other accelerometer(s) used will be connected to a computer system, such as the aircraft's flight control computer, whereby when the control surface on which it is placed is excited a curve of the readings from the accelerometer, indicating the free play in the control surface will be plotted, as described more fully below.

Figure 4:
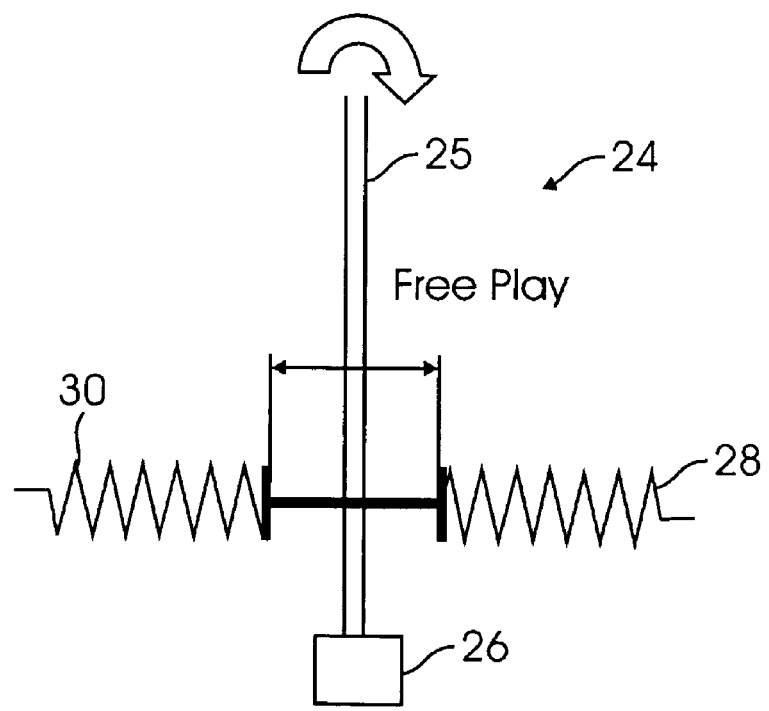
FIG. 4 is a schematic view of a physical pendulum illustrating how the dynamic system and method of the present invention monitors free play in a control surface.

FIG. 4 shows an example of a simple simulation of the dynamic measuring of free play in a control surface, such as aileron 23. This simulation is a physical pendulum 24 with an arm 25 having a point mass 26 at the bottom. The arm 25 and point mass 26 are allowed to swing freely for a certain free play value in a motion that represents a low frequency pendulum mode. Once the free play is exceeded the pendulum arm 25 will impact springs 28, 30. The springs 28, 30 are connected to each other and allow the pendulum arm and point mass to swing freely between them. In the free play zone gravity acts as the stiffness term and the control surface frequency is that of a simple pendulum. When the free play zone is reduced to zero the pendulum is in contact with the springs 22, 30 and the system possesses a higher frequency due to the stiffness effect of the springs and gravity. The higher frequency represents the control surface rotation mode without free play.

Figure 5:
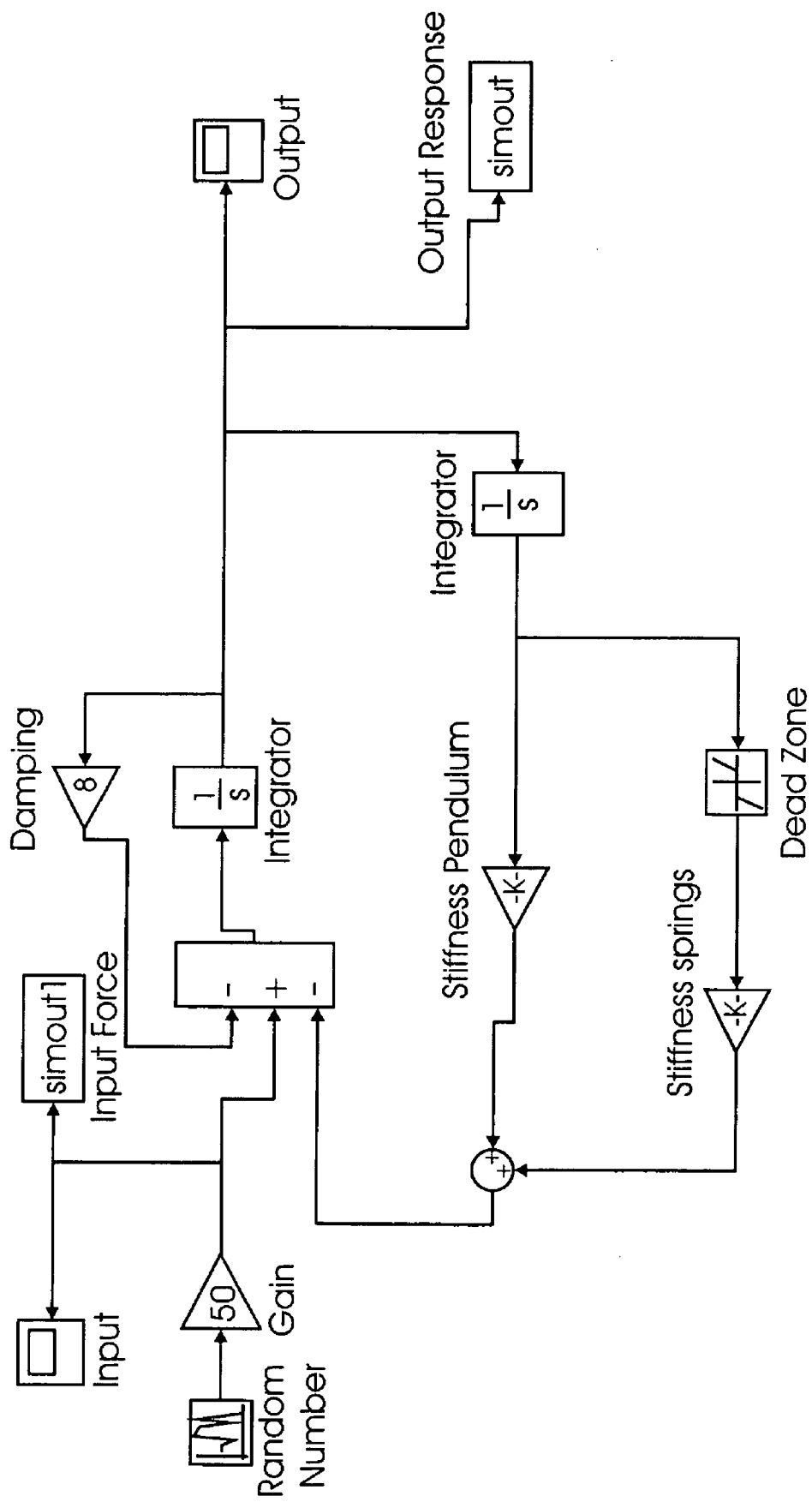
FIG. 5 is a schematic view of a dynamic free play simulation in accordance with the method of the present invention.

To verify the results, the simple pendulum with free play 24, as shown in FIG. 4, may be simulated using Matlab® Simulink® software and a simulation model is shown in FIG. 5. As used herein, all occurrences of MATLAB and SIMULINK are registered trademarks of The MathWorks, Inc. This simulation integrates the second order differential equation in time. The free play is simulated using a "Dead Zone" in Matlab® Simulink®. The amount of free play in the "Dead Zone" (hereinafter the "free play zone") is adjustable. As the equation of motion is integrated the stiffness is changed as a function of the pendulum position. If the pendulum is within the free play zone the spring stiffness is reduced to zero. The time history accelerations of the pendulum are stored for post processing in Matlab® Simulink® files. Simulation time steps are set at 0.01 seconds or 100 samples per second. The stiffness values are adjusted with gain blocks to yield two distinct frequencies for inside and outside the free play zone. The frequency in the free play zone is 1 Hz for the free pendulum mode. The frequency for the pendulum 24 with the springs 28, 30 attached is 5 Hz. Simulations are conducted utilizing a variety of different inputs. The inputs are: step inputs, sine sweeps and random inputs. Only the random inputs are discussed herein. The simulations are run for 20 seconds and all output data are recorded. Damping values are assumed to insure response inside and outside the free play zone.

Figure 6:
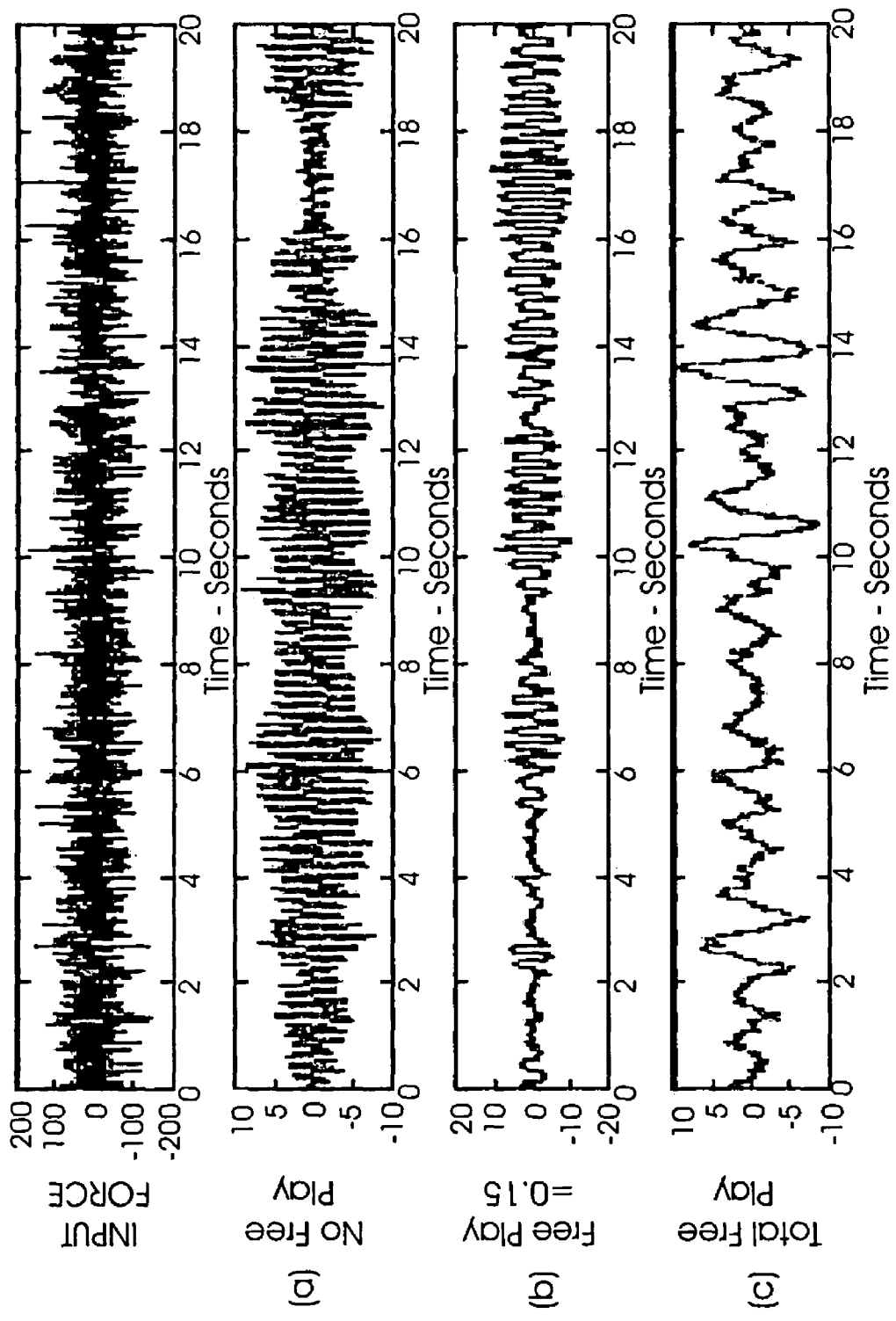
FIG. 6 shows the results of three representative simulations in accordance with the method of the present invention.

The results of three representative simulations are shown in FIG. 6. The top or upper plot illustrates the input force time history with three acceleration plots shown in lines labeled (a), (b) & (c) for the same random inputs. The three cases considered were (a) zero free play, (b) ±0.15 inches free play and (c) ±∞ free play. The time history plot for case (a) no free play response was at a higher frequency due to engagement of the springs. The bottom curve (c) is for a dead zone which is infinitely large. That is, for (c) the system is always in free play (the springs are not engaged and the system acts as a simple pendulum). The frequency of the time history response for infinite free play (c) was obviously less than the first case (a) of zero free play. The middle curve (b) is the response for a typical value of free play ±0.15 inches in the simulation. The middle curve (b) possesses both frequency characteristics of the other two systems, (a) no free play and (c) infinite free play.

Power Spectral Densities (PSD) of the three time histories of FIG. 6 from the Matlab® Simulink® simulations processed using Matlab® Signal Processing Tool Box™ ("SP-TOOL") are shown in FIG. 7. As used herein, SIGNAL PROCESSING TOOLBOX is a trademark of The MathWorks, Inc. The infinite free play time history of (c) resulted in a PSD with a peak frequency of 1 Hz. The peak PSD response for the no free play case (a) is 5 Hz, and the PSD of the time history response (b) of ±0.15 free play is shown to have a peak response of 3.5 Hz. This peak response was perplexing because the simulation had only two paths: a 1 Hz and a 5 Hz path. The nonlinear time history response with free play when processed in the frequency domain using a Fast Fourier Transformation (FFT) yields an apparent peak between 1 Hz and 5 Hz. In actuality the time history contains only two frequencies 1 Hz and 5 Hz. It is felt that a nonlinear frequency response process would actually show the two distinct frequency responses at 1 Hz and 5 Hz. The relative magnitude of the 1 Hz and 5 Hz frequency response would be a direct indication of the amount of time spent in and out of free play. The nonlinear time history simulations when processed using the linear FFT yield a peak response at an apparent frequency between the 1 Hz and 5 Hz boundaries.

Figure 8:
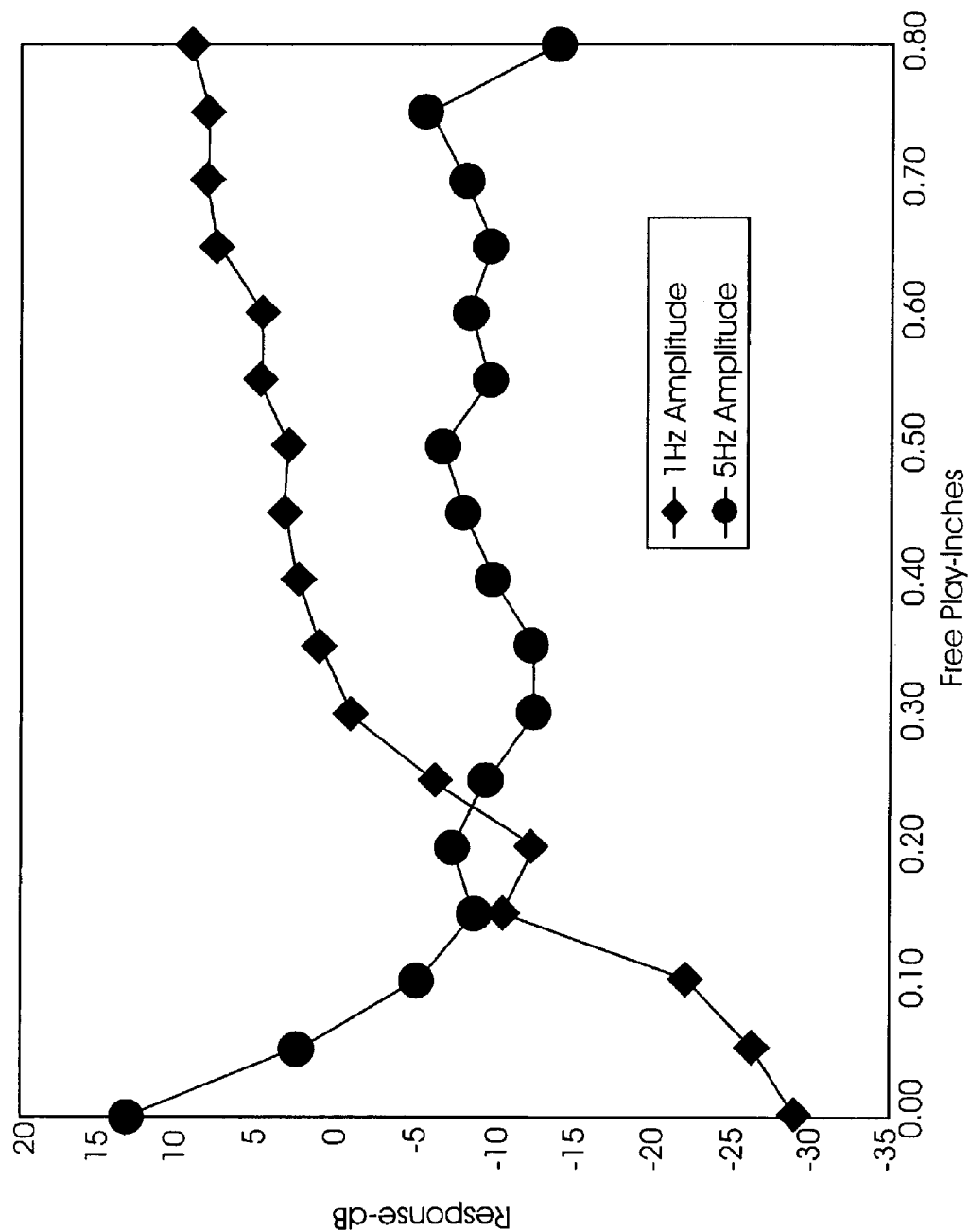
FIGS. 8 and 9 are a typical plots of processed data response amplitude and response peak frequency versus displacement for free play simulations of the dynamic system and method of the present invention.

Multiple simulations were conducted with varying values of free play from zero to ±0.8 inches in ±0.05 inch increments. All simulations had the same random input to the system. SPTOOL was used to transform the nonlinear time history simulation into the linear frequency domain. The PSD responses were recorded at both 1 Hz and 5 Hz to determine the amount of energy each of the two distinct systems: free play and no free play. FIG. 8 is a plot of both the 1 Hz and 5 Hz response levels as they varied with different amounts of free play. The response level of the 1 Hz frequency variation increased with increasing free play levels. Conversely, the amplitude of the 5 Hz responses in the PSD decreased as the free play increased. For values above ±0.15 inches the 5 Hz response is flat and does not change with increasing free play. The 1 Hz amplitude response is somewhat linear and can serve as a correlation of dynamic response of the system to assess the magnitude of the free play.

Figure 9:
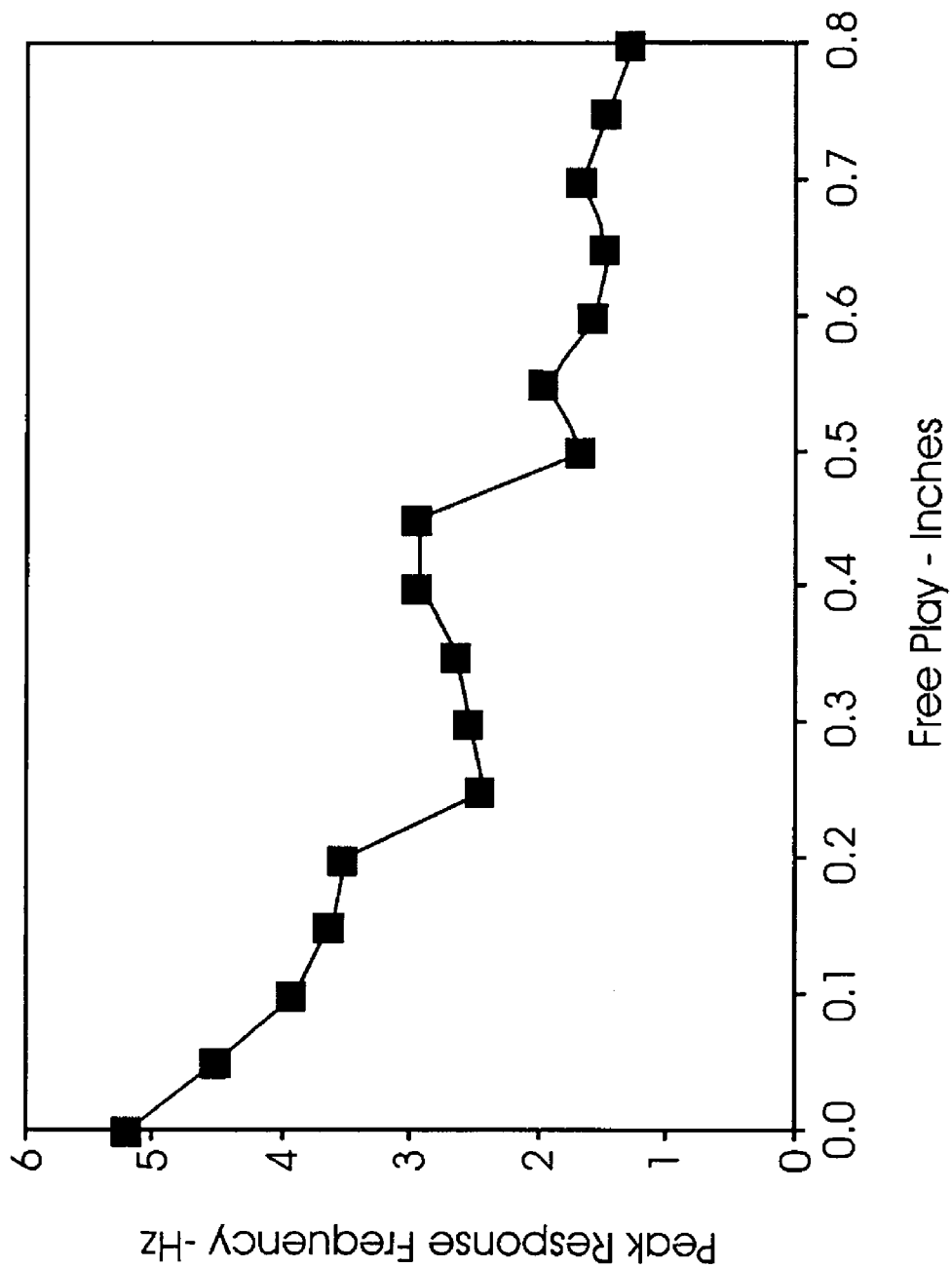

As shown in FIG. 9 PSD pseudo peak frequency response varied as the free play values are varied in the simulations. FIG. 9 shows the variations in the pseudo peak response as free play is varied from zero to ±0.8 inches. The pseudo peak response frequency approaches 1 Hz at the free play value of ±0.8 inches, while the frequency at zero free play is 5 Hz and appears to vary linearly with increasing free play to the 1 Hz free play frequency. This linear frequency decrease variation with free play does not hold for free play values greater than ±0.20 inches and less than ±0.45 inches.

The monitoring method of the present invention will be performed on an aircraft before or after flights to assess the free play and determine the safety of the aircraft. Both the system and the method for monitoring the free play of aircraft control surfaces of the present invention will accomplish this in a more expeditious and less time consuming manner.

Those skilled in the art will appreciate that various adaptations and modifications of the just-described preferred embodiments may be configured without departing from the scope and spirit of the invention. Therefore, it is to be understood that, within the scope of the appended claims, the invention may be practiced other than is specifically described herein.

What is claimed is:

1. A system for monitoring free play in control surfaces of aircraft, comprising:
   at least one accelerometer placed in or on at least one control surface of the aircraft;
   a computer system connected to the at least one accelerometer, the computer system including a connection to an actuator of the at least one control surface to vibrate the at least one control surface;
   means for receiving a signal from the at least one accelerometer when the at least one control surface is vibrated;
   means for monitoring a first frequency of the at least one control surface within the received signal that represents a control surface rotation mode without free play, and a second frequency of the at least one control surface within the received signal that indicates an amount of free play of the at least one control surface; and
   means for measuring a value of an amplitude of the second frequency to determine the amount of free play of the at least one control surface.

2. The system of claim 1, wherein there are a plurality of accelerometers mounted on a plurality of control surfaces on the aircraft.

3. The system of claim 2, wherein the computer system is the flight control system of the aircraft.

4. The system of claim 2, wherein the computer system is a stand-alone system that is separate from the computer system of the aircraft.

5. The system of claim 1, wherein the computer system is a stand-alone system that is separate from the computer system of the aircraft.

6. The system of claim 1, wherein the computer system is the flight control system of the aircraft.

7. The system of claim 1, wherein the first frequency is higher than the second frequency.

8. The system of claim 1, wherein the second frequency is a frequency that represents a pendulum mode of the control surface.

9. The system of claim 1, wherein the means for measuring comprises the at least one accelerometer that is activated through the vibration of the at least one control surface to output a plurality of readings that produce a plot of the amount of free play in the at least one control surface.

10. A method of monitoring free play in control surfaces of aircraft, comprising:
    connecting a computer system to at least one accelerometer located in or on at least one control surface of the aircraft, the computer system providing a connection between the accelerometer and an operator of the at least one control surface;
    vibrating the at least one control surface with an actuator;
    receiving, at the computer system, a signal from the at least one accelerometer when the at least one control surface is vibrated;
    monitoring, by the computer system, a first frequency within the received signal that represents a control surface rotation mode without free play, and a second frequency that represents a pendulum mode that indicates an amount of free play of the at least one control surface; and
    measuring, through the computer system, a value of an amplitude of the second frequency to determine the amount of free play in the at least one control surface.

11. The method of claim 10, wherein the computer system is the flight control system of the aircraft.

12. The method of claim 10, wherein the computer system is a stand-alone system that is separate from the computer system of the aircraft.

13. The method of claim 10, wherein the first frequency is higher than the second frequency.

14. The method of claim 10, wherein the measuring comprises plotting a curve of readings from the accelerometer that indicate the amount of free play in the at least one control surface.

15. A system for monitoring free play in control surfaces of aircraft, comprising:
    a plurality of accelerometers embedded in or placed on a plurality of control surfaces of the aircraft, the plurality of accelerometers being connected to a flight control computer of the aircraft;
    a connection between the flight control computer of the aircraft and actuators of the plurality of control surfaces, the actuators configured to selectively vibrate the plurality of control surfaces; and wherein the flight control computer of the aircraft receives a signal from a vibrated one of the plurality of control surfaces;
    means for monitoring a first frequency within the received signal that represents a control surface rotation mode without free play, and a second frequency that represents a pendulum mode that indicates an amount of control surface free play of the at least one control surface; and
    means for measuring a value of an amplitude of the second frequency to determine the amount of control surface free play.

16. The system of claim 15, wherein the first frequency is higher than the second frequency.

17. The system of claim 15, wherein the means for measuring comprises the at least one accelerometer that is activated through the vibration of the at least one control surface to output a plurality of readings that produce a plot of the amount of free play in the at least one control surface.

* * * * *